United States Patent Office.

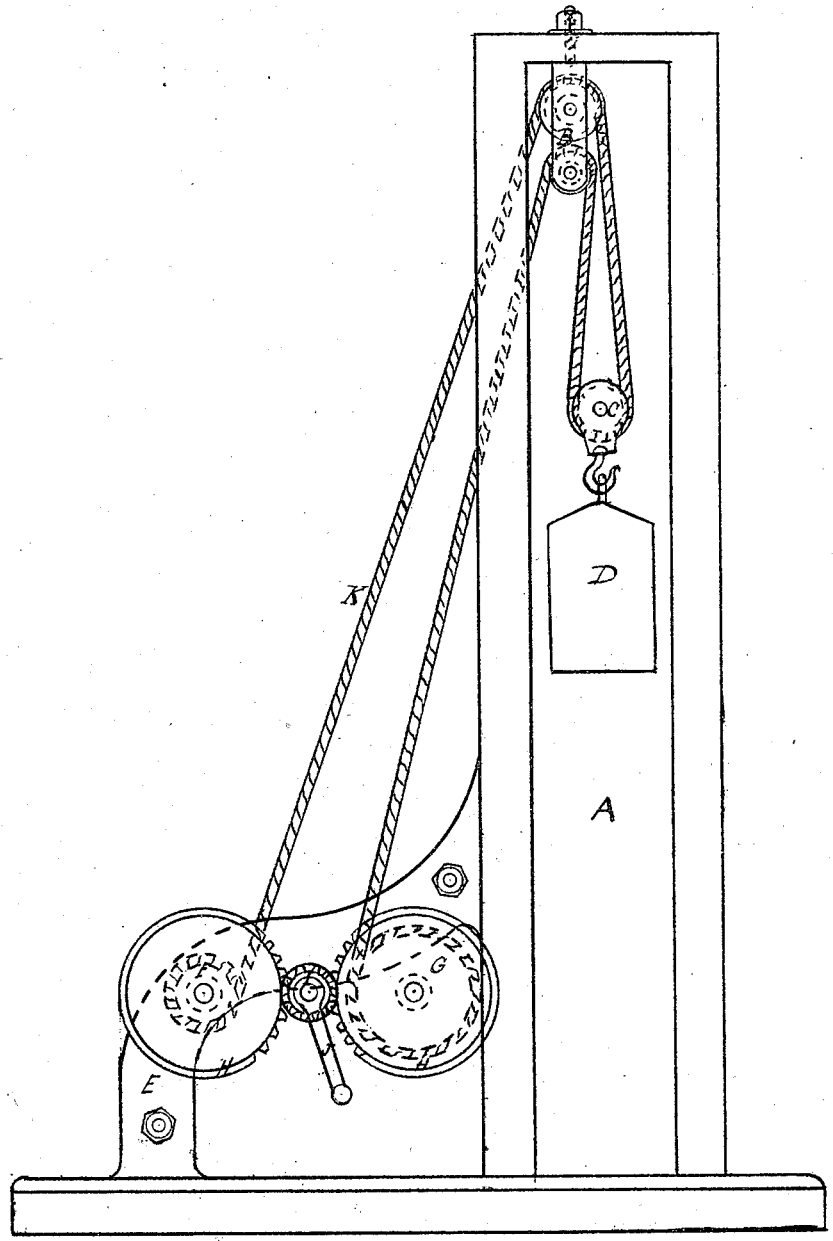

WILLIAM DYATT, OF NEW YORK, N. Y.

Letters Patent No. 97,487, dated December 7, 1869.

IMPROVED HOISTING-APPARATUS.

The Schedule referred to in these Letters Patent and making part of the same.

*To all whom it may concern:*

Be it known that I, WILLIAM DYATT, of the city, county, and State of New York, have invented a new and useful Improvement in "Hoisting-Apparatus," of which the following is a specification.

The nature of my invention consists in the arrangement and combination of the gearing employed for operating the drums, whereby all accidents will be prevented arising from the necessity of having to turn the drum till the weight is landed or of losing hold of the handle, and, at the same time, dispense with the use of pawls or brakes while a weight is still suspended.

The accompanying drawing represents a side elevation, partly in section, of a hoisting-apparatus embodying my invention.

D represents the frame, to the lower part of which a large drum, F, and a small drum, E, are arranged.

To the ends of the shafts of each of these drums F and E, wheels G and H, of equal diameter, are securely fastened, between which a pinion, I, is arranged, meshing, at the same time, into the wheel G and into the wheel H.

To the end of the shaft of the pinion J a handle is attached for the purpose of operating the same.

Near the top of the frame D a double pulley, B, is fixed.

K is the rope attached to the smaller drum E, around which it passes, then over the upper pulley B, under the wheel of a loose pulley, C, provided with the necessary hook, then over the lower wheel of the pulley B and around the larger drum F, to which the other end of said rope is fastened.

The drums revolve both in the same direction, the rope being placed so that it is being gathered on one while it is being relinquished by the other.

Greater speed in the raising or lowering of the weight may be obtained by increasing the size of the gear-wheel on the smaller drum, thereby enabling the larger drum to retain its speed while the speed of the smaller drum is diminished.

By this arrangement of the drums and gearing and the manner of combining the same, no ratchet-wheel, pawl, or brake will be required, and the weight may be raised or lowered to any point, where it will be sustained, even if the handle on the pinion-shaft is left loose or free.

I do not claim the arrangement of two drums of unequal diameters; but

What I claim as my invention, and desire to secure by Letters Patent, is—

The arrangement of two drums, F and E, in combination with their wheels G and H, worked both simultaneously by a pinion, J, placed between said wheels and one continuous rope or chain passing over double pulley B and pulley C, substantially as and for the purpose hereinbefore set forth.

The above specification signed by me, this 11th day of September, 1869.

WILLIAM DYATT.

Witnesses:
GEORGE HAYES,
A. M. STENBACK.